Aug. 16, 1949.  P. C. KEITH  2,479,496
CONTROLLING CATALYTIC EXOTHERMIC REACTIONS
OF GASIFORM REACTANTS
Filed May 18, 1946
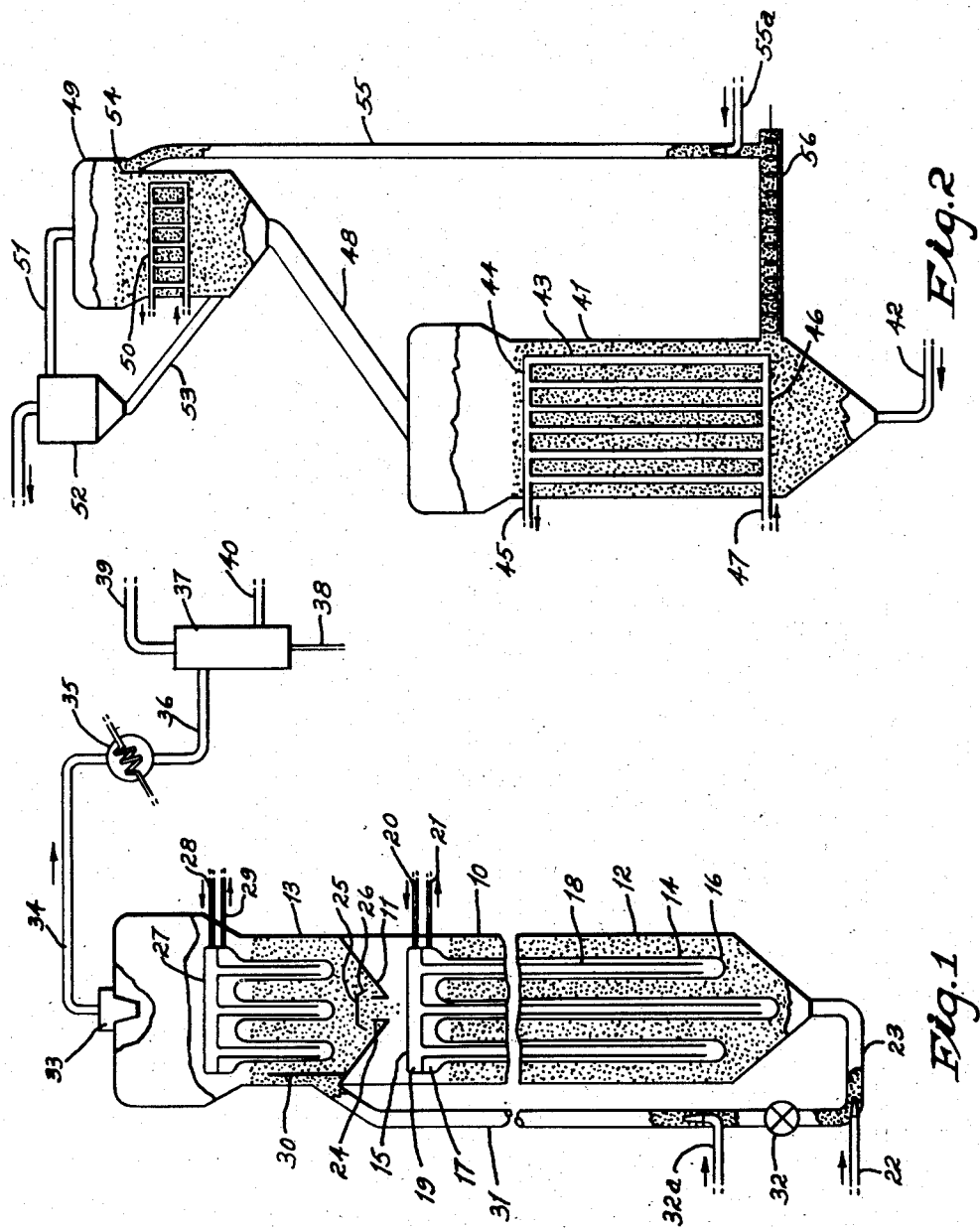
INVENTOR.
PERCIVAL C. KEITH
BY Patented Aug. 16, 1949

2,479,496

UNITED STATES PATENT OFFICE 2,479,496

CONTROLLING CATALYTIC EXOTHERMIC REACTIONS OF GASIFORM REACTANTS

Percival C. Keith, Peapack, N. J., assignor to Hydrocarbon Research, Inc., New York, N. Y., a corporation of New Jersey Application May 18, 1946, Serial No. 670,808

5 Claims. (Cl. 260—449.6)

The present invention relates to the control of temperature in exothermic reactions involving gases or vapors and more specifically is concerned with vapor phase, catalytic reactions wherein the contact mass comprises a powdered, active material advantageously maintained within predetermined optimum limits of temperature throughout contact with reactant gases.

It is usually quite important, as well as troublesome, in the catalytic exothermic reaction of gasiform reactants to maintain the optimum reaction temperature uniformly throughout the contact mass. This requirement in many instances seriously limits the use of fixed bed reactors in view of the special heat transfer problems associated with local overheating. Good temperature control has however been achieved with the development of the so-called fluidizing technique wherein the catalyst particles are maintained in a fluid-like condition by the upward passage of gasiform reactants, each catalyst particle being in effect suspended in the gasiform fluid and having relatively turbulent and random movement. Disposed in heat transfer relationship with suitable cooling surfaces, the fluidized catalyst mass exhibits heat transfer properties equivalent to those characteristic of a liquid of desirable thermal properties so that the reaction may be held within narrow temperature limits.

In the so-called dense phase type of fluidized operation, to which the present invention in its preferred aspect is related, the rate of reactant flow is such as to create a pseudo-liquid level of catalyst powder within the reactor, the reactants including reaction products emerging therefrom for further treatment. However, since the effluent emerging from the fluidized dense bed inevitably tends to entrain at least a small portion of the powdered catalyst at the reaction temperature, reaction continues to take place between the unreacted or incompletely reacted gases contacting the catalyst particles and this action may continue until the gases and solids are separated. Such separation is normally carried out by means of filters, electrical precipitators, cyclone separators or the like. In each instance, nevertheless, due to the exothermic nature of the reaction and the removal of the catalyst and reactants from the temperature-controlling influence of the catalyst bed, the temperature rises, and at points above the pseudo-liquid level and in the separating device, may reach a point such that the character of the product deteriorates materially and the catalyst is damaged.

Such a condition develops most frequently when the emerging gases or vapors contain a substantial proportion of unreacted components, as when the reaction is carried out in a stepwise manner, and when for some reason local increases occur in the concentration of entrained catalyst, as, for example, within a cyclone separator or where the catalyst collects upon the surface of filters arranged to separate the catalyst from the gases. Thus, when a porous refractory element is used to filter off powdered iron catalyst from reaction gases containing some unreacted hydrogen and carbon monoxide, the layer of catalyst which builds up on the filter element may easily attain a temperature above 900° F., thereby injuring the catalyst and synthesis products. The catalyst layer may even coke up so that blowing-back is not effective in knocking the catalyst off from the filter element.

An object of the present invention is to control reactivity of effluent reactants and catalyst in exothermic, catalytic reactions in such a manner as to prevent undesired reactions and impairment of the catalyst or reaction products.

A further object contemplates the adaptation of efficient and practical means to prevent temperature of effluent reactants and entrained catalyst from rising beyond the desired maximum temperature level of reaction and preferably to effect a prompt and efficient cooling action of the mixture to a point where uncontrolled activity is no longer a problem. Other objects include facilitation of staged or stepwise exothermic reactions; removal of entrained powder from gasiform reactants in a simple and economic manner; and effective removal of exothermic heat of reaction from the process. Other objects of the invention will be apparent from the following description.

In accordance with the present invention the effluent vapors from a catalytic reaction zone, containing active reactants and some entrained catalyst are passed concurrently through or into a second or cooling mass of fluidized powder maintained at a temperature substantially below the optimum reaction temperature and preferably at a temperature level sufficiently low to inhibit any material continuance of the reaction. The inherent characteristics of fluidization described above are such as to cause a prompt and efficient reduction in temperature both of the catalyst and associated vapors, to the required level. The gasiform fluids continue through the mass and are withdrawn for further treatment.

The entrained catalyst particles become at least temporarily entrapped in the cooling mass. It should be noted, however, that entrained catalyst no longer presents any serious problem since even where re-entrained in the gases from the cooling zone, separation from the entraining fluid, by filters, cyclones, or any other known means can proceed at a temperature level which inhibits harmful continuance of the catalytic reaction.

The mass of powdered material in the so-called second or cooling zone may most advantageously comprise simply a batch of the powdered catalyst used in the reaction zone, although any suitable inert, particulate material may be employed.

Preferably the cooling zone should be so designed with respect to the size of the particles of the powder and the rate of reactant flow, to maintain uniform fluidization under closely controlled temperature conditions. To this end cooling surfaces held at the required temperature are properly disposed in contact with the powdered mass. Most efficient temperature control, and accordingly cooling, is effected under conditions of dense phase fluidization mentioned above.

Where the cooling zone operates with powdered catalyst the particles which may be entrained in the effluent thereof may upon separation, be returned to the catalytic reaction zone as make-up for the entrainment losses therein. Accordingly, it is desirable to design the two zones with means to return catalyst to the reaction vessel at a rate substantially equivalent to the rate of entrainment.

The accompanying drawing more or less diagrammatically illustrates, by way of example, certain preferred means for carrying out the process of the present invention it being understood that many other modifications and embodiments will occur to those skilled in the art, upon consideration of the present disclosure. In the drawing, Figure 1 shows, partly in vertical section, one form of reactor suitable for practicing the present invention and Figure 2 shows an alternative construction.

Referring first to Figure 1, the numeral 10 denotes a vertical reaction vessel divided by a partition 11, into a lower zone 12 and an upper zone 13. Each of said zones 12 and 13 is designed for the disposition of a mass of powdered catalyst maintained in a turbulent state of dense phase fluidization by incoming reactant gases. The lower or reaction zone, which may take any more or less conventional form found in this type of operation is provided with cooling surfaces which comprise bayonet-like tubes 14 extending downwardly from a header 15 into the fluidized mass of catalyst. More specifically, each of the tubes, closed at its lower end as at 16, communicates at its upper end with an interior chamber 17 of header 15. Internal tubes 18, coaxially disposed within tubes 14 in spaced relationship to the inner walls of tubes 14, are open at their lower ends, and communicate at their upper extremities with a second chamber 19 of the header 15. An inlet tube 20 communicates with header chamber 19 and an outlet tube 21 with the chamber 17. The internal cooling element thus provided is supplied with a suitable heat carrier fluid such as water from a source not shown, through inlet tube 20. The coolant flows through chamber 19 and downwardly in inner tubes 18, rising in the annular spaces between tubes 18 and 14 in indirect heat exchange relationship to the mixture of powdered catalyst and reactants surrounding tubes 14. The heat carrier fluid at elevated temperature then flows into chamber 17 and is discharged through outlet 21.

As a preferred alternative the coolant system may, as is known, be maintained under a predetermined pressure suitable to permit boiling of the coolant at the optimum temperature for cooling the reactant mass whereby the effluent coolant withdrawn from outlet pipe 21 is entirely or largely in vapor form. Instead of water, other useful coolant fluids such as mercury or Dowtherm, may be employed.

Advantageously the lower or reaction zone is occupied with powdered catalyst in a fluidized dense phase, to a point just below header 15. Thus the powder, under the conditions of flow prevailing will set up a pseudo-liquid level which may be just below the header in order to avoid dead spots. On the other hand such precaution is not necessary when the header is so designed as to permit free streamlined flow of the mixture in characteristic uniform internal turbulence.

The mixture of reactant gases is introduced through pipe 22 from a source not shown, into conduit 23 communicating with the bottom of reaction zone 12.

The partition 11 is provided with a central inlet 24 projecting upwardly into the catalyst mass and surmounted by a vertically spaced baffle having a top wall 25 terminating in margins 26 which extend downwardly in frusto-conical relationship. As will be apparent, the baffle is so spaced from the inlet tube 24 by any suitable supporting means, not shown, as to permit free flow of reactant gases and vapors as well as entrained catalyst from the reaction zone 12 into upper zone 13, but prevents reverse movement of settled catalyst to the lower zone when the reactant flow is terminated.

The upper or cooling zone 13 is also provided with an internal cooling element 27 which may be identical in construction with the exchanger 15 previously described and provided with inlet and outlet tubes 28 and 29 respectively.

A second baffle 30 accumulates excess catalyst powder in zone 13 for return to the catalyst mass in reaction zone 12 and to this end the space behind baffle 30 communicates with standpipe 31 which feeds into conduit 23 via any suitable feeding device such as a star, or bucket feeder 32. Pipe 32a serves to introduce an inert gas or vapor to keep the catalyst in standpipe 31 in a free-flowing condition. The inlet tube 22 in the present embodiment is so arranged as to operate as an injector, directing the entire flow of reactant gases through conduit 23 into the reaction zone together with such catalyst as is supplied by standpipe 31. In some cases it may be desirable to provide means above and below the feeder 32 for introducing small quantities of steam or other inert gas to the standpipe for promoting aeration of its contents and preventing clogging.

The upper portion of the cooling zone 13 is advantageously enlarged to provide a settling space. The numeral 33 designates a filtering element advantageously formed of a porous refractory material such as Alundum, which passes the gasiform effluent from the reaction zone while retaining the catalyst particles in zone 13. The effluent stream from the filter 33 is conducted by pipe 34 through an exchanger or condenser 35, and thence through pipe 36 to a separator 37 where condensed moisture is removed by pipe 38, gases at 39 and condenser liquid hydrocarbons at 40, all for further treatment, use or separation and recovery.

In operation the mixture of reactant gases flows upwardly through the fluidized mass of catalyst in the reaction zone, emerging from the pseudo-liquid surface with a small amount of entrained catalyst. Temperature below the pseudo-liquid surface is maintained at the desired optimum by the action of the internal cooling element 15. The emergent reaction gases, including a substantial proportion of unreacted or incompletely reacted feed gases, flow directly through the tube 24 and into the upper mass of catalyst in the cooling zone 13, entrained particles of catalyst being immediately intermingled and entrapped therein. The mass of catalyst in cooling zone 13 is held uniformly at a temperature substantially below that of the reaction zone by operation of the internal cooling element 27. It is particularly important to note that in a properly designed fluidized cooling zone of this character, cooling of the gases and particularly the entrained catalyst takes place rapidly, in most instances almost instantaneously, to the end that continuance of the catalytic reaction is immediately inhibited.

Effluent vapors from the upper zone pass the filter 33 en route to the condensation and recovery means, but without being subject to any further reaction in the presence of entrained particles caught on the filter element 33. Thus such particles at the lower temperature of the cooling zone are not subject to overheating nor are the reactants subjected to uncontrolled conversion.

Catalyst rising above the baffle 30 and collecting therebehind feeds downwardly through standpipe 31 and feeder 32 to be reinjected to the reaction zone with the reactant fresh feed gases from pipe 22.

Referring to the alternative arrangement shown in Figure 2, a reaction chamber 41 is supplied with reactant feed gas by inlet pipe 42 passing upwardly through the fluidized catalyst surrounding a heat exchanger element 43. In this instance the heat exchanging or cooling means 43 comprises an upper or outlet header 44 exhausting into outlet pipe 45 and a lower or inlet header 46 provided with an inlet pipe 47, a series of vertically disposed cooling tubes extending between the headers and being supplied with coolant as before. Effluent vapors from the reactor together with entrained catalyst pass directly through duct 48 to the bottom of a cooling chamber 49 similar in construction to reactor 41 and provided with similar cooling means 50 maintained at a substantially lower temperature.

Effluent vapors from the cooling chamber 50 pass through duct 51 to cyclone separator 52 where entrained catalyst particles are separated out and returned to a point well below the surface of settled catalyst in the cooling zone, by means of standpipe or dip leg construction 53. Ordinarily the head of settled catalyst in the pipe 53 will balance the pressure between the reaction zone and that within the cyclone separator thus continuously permitting return of entrained catalyst.

Continuation of proper operating level of catalyst in the reactor 41 is assured by means including a baffle 54, a standpipe 55, and a screw conveyor 56 discharging into reactor 41. More particularly, as catalyst accumulates in chamber 49 above normal pseudo-liquid level it is received behind baffle 54 and moves downwardly in standpipe 55 into conveyor 56, represented only symbolically and comprising a screw or any other mechanical feeding device capable of moving catalyst into zone 41. Pipe 55a is used to aerate standpipe 55 and thus prevent clogging by the catalyst powder therein.

In the operation of this device likewise, the reactant feed gases are subjected to partial conversion in reactor 41, the effluent with at least the inevitable small amount of entrained catalyst passing directly to the cooling chamber 49 where immediate cooling takes place. The effluent from the chamber 49 at the lower temperature, now passes directly to the separator means 52 without hazard of catalyst degradation or adverse effect upon the reactants. During operation relative disposition of catalyst between the two dense phase masses of the system is controlled by the catalyst return means described above.

As a specific example of the present invention the reaction zone may be provided with a fluidized bed of powdered iron catalyst containing about 1 to 3% potassium oxide and about 2 to 3% alumina. The catalyst has a particle size smaller than 200 mesh, about 60% passing a 325 mesh screen. This accordingly provides a suitable catalyst for carrying out the Fischer type catalytic conversion of carbon oxide and hydrogen into hydrocarbons, oxygenated hydrocarbons and the like. Synthesis gas containing about 86% of a mixture of hydrogen and carbon monoxide in the molar ratio of substantially 2:1, and about 14% of carbon dioxide passes through the catalyst at an average linear velocity of about 1.5 feet per second so that the mass of catalyst powder assumes a state of dense phase fluidization.

The reaction mass is held at a temperature of 600° F. with a variation of not more than 5° F. therefrom, and a pressure of 200 pounds per square inch gauge. The effluent reactants with small quantities of entrained catalyst pass directly into the cooling zone containing a smaller mass of the same powdered catalyst maintained under identical conditions but for the fact that cooling surfaces are controlled as to maintain a catalyst temperature of about 400° F. With a fluidized cooling bed only six feet in depth the effluent gases and such particles, as are entrained, issue at a temperature substantially equal to 400° F. and may be passed through filters or any other separating means without any material temperature rise in the gasiform materials or the catalyst particles. There is no impairment of operation, of catalyst, or of the reaction products due to continuing reaction above the pseudo-liquid level of the catalyst bed, even though the effluent gases contain about 25% $H_2$ and 10% CO available for reaction.

Operating in the same manner but for the omission of the cooling zone and the use of an Alundum filter above the reaction zone, the layer of particles accumulated on the filter after a few hours of operation attained a temperature of 900° F. with consequent coking of the catalyst layer into a continuous mass.

The present invention, as indicated above, is particularly advantageous in the case of the operation of the Fischer synthesis and other similar types of exothermic catalyst reactions carried out in successive stages wherein each stage is so conducted that only a portion of the total reactant feed gases are converted in each. Staged operation of this character may be conducted while separating the products of conversion or any part thereof between stages. Thus, for example, it may be desirable, in the synthesis of hydrocarbons by the reduction of carbon monoxide with hydrogen as illustrated above, to carry out a staged operation wherein water vapor formed as a by-product of the reaction, is removed by condensation after each stage as an effective means for improving the overall efficiency of the reaction. So also the present invention is adaptable to the separation of hydrocarbon products between stages. When operating in this manner it is merely necessary to combine in series, a plurality of units such as shown in Figure 1 of the drawing, the gaseous effluent from the pipe 39 being conducted directly into the fresh feed tube 22 of the succeeding stage. With this arrangement the hydrocarbons from the several outlet pipes 40 are collected for further treatment or individual recovery. Similarly aqueous layers delivered from the outlet pipes 38 may be collected and treated for the recovery of the oxygenated hydrocarbons normally contained therein.

Where, however, intermediate recovery of products between the stages is not desirable the entire effluent gases from the outlet conduit 34 may be directed to the succeeding stage. One instance where stagewise operation without separation of any products between stages might be employed is the case where different catalysts are used in the several stages.

Particularly, attention is directed to the fact that staged operation in this manner has the additional advantage of maintaining a high degree of temperature control and uniformity throughout. The several intermediate cooling zones have the effect of removing a substantial proportion of the exothermic heat of reaction so that a more easily controllable heat load is placed upon the cooling surfaces of the succeeding reaction zones. Moreover, as indicated above, the several arrangements shown herein permit a recirculation of the products of reaction through each reactor with accompanying advantageous results.

While the present invention has been illustrated more specifically in connection with the catalytic reduction of carbon monoxide and carbon dioxide in the formation of hydrocarbons and oxygenated hydrocarbons, it is nevertheless applicable to all exothermic reactions wherein reactant gases are prone to convey solid catalyst particles from the reaction bed under conditions continuing uncontrolled reaction. Thus, for example, the invention is applicable to the catalytic oxidation of organic compounds to oxygenated products wherein it is desirable to inhibit the formation of carbon dioxide by uncontrolled over-oxygenation. Similarly the process is of advantage in the selective hydrogenation of mixtures of olefinic compounds wherein hydrogenation of certain of the olefins in the mixture may, by operating in accordance with the present invention, remain selectively unhydrogenated by application of the temperature control herein provided.

In the vapor phase catalytic oxidation of aromatic compounds like toluene and naphthalene to benzoic acid and phthalic anhydride, respectively, vanadium and chromium oxides form suitable catalysts whereas in the oxidation of methanol to formaldehyde molybdenum oxide catalysts are used. The destructive hydrogenation of mineral oils may be carried out in the presence of a catalyst comprising molybdenum sulphide and zinc oxide.

The synthesis of hydrocarbons from carbon oxides and hydrogen may, as is known, be catalyzed by cobalt, nickel or ruthenium catalyst in addition to the iron powder disclosed above. Normally the catalyst contains from about 1 to 2% potassium oxide ($K_2O$) and about 2 to 3% alumina ($Al_2O_3$) as promoters. Other useful promoters are, for example, other alkali metal or alkaline earth metal compounds, or the oxides of uranium and vanadium. The catalyst may be unsupported, or supported upon such materials as diatomaceous earth, silica gel, Filtrols, and the like. An example of a supported catalyst is one containing about 32% cobalt, 64% Filter-Cel and about 3-4% thorium and magnesium oxides.

While the invention in its preferred embodiment is directed to exothermic catalytic reactions carried out through the agency of a fluidized bed of powdered catalyst maintained in a so-called condition of dense phase fluidization, in its broadest aspect, it is not so limited, but contemplates the cooling of any entrained mixture of catalyst and reactants which have left the zone of controlled temperature, as a means of preventing uncontrolled reactions during the subsequent separation of the catalyst powder from the reactants. In short the invention is broadly applicable to the control of catalyst temperature whether the catalyst is relatively settled or substantially entrained in the reactants, provided that the degree of fluidization is such as to permit efficient heat transfer to cooling surfaces at such rate that the temperature throughout the mass may be rapidly reduced to substantially uniform predetermined levels.

It is particularly significant to note that the present invention provides a process wherein carbon formation and other destructive influence which tend to require catalyst regeneration or even final disposition of spent catalyst are so inhibited as to promote increased catalyst life. This permits operation of the process at higher reaction temperatures than would normally be considered practical, as, for example, where it is desired to produce relatively lower molecular weight hydrocarbons in the reduction of carbon oxides. So also objectionable formation of carbon dioxide in this process which tends to characterize the use of iron catalyst is substantially or largely inhibited.

While specific temperatures have been referred to it will be understood from the foregoing that the temperatures employed will depend on the catalyst used and the particular products desired. In short, the temperature of the reaction zone as well as the temperature of the cooling zone may be easily selected in view of the foregoing principles, in accordance with the reaction being carried out and the products desired.

Obviously any modifications and variations of the invention as set forth above may be made without departing from the spirit and scope thereof and therefore only such limitations should be imposed as are indicated in the appended claims.

I claim:

1. In the vapor phase exothermic catalytic process of synthesizing hydrocarbons from hydrogen and carbon monoxide in the presence of a mass of solid particle synthesis catalyst active to effect the aforesaid synthesis, wherein said reactants are passed in contact with said synthesis catalyst in a reaction zone, under controlled, predetermined operating temperature contact is maintained until a predetermined portion only of the reactants are converted into desired products of reaction, and the resulting effluent product stream containing unconsumed reactants is withdrawn from said reaction zone with entrained catalyst in a state of exothermic catalytic activity and subject to overheating under uncontrolled temperature conditions, the improvement which comprises promptly suppressing said undesired exothermic activity by introducing said effluent stream, while substantially at said operating temperature, directly into a substantial body of solid catalyst particles maintained in a turbulent state of dense phase fluidization in the presence of cooling surfaces effective to maintain the temperature of said fluidized mass of catalyst within a range substantially uniformly below the said temperature of the reaction zone, controlling the rate of introduction of said stream such that rapid quenching is realized and recovering quenched products of reaction from said fluidized body of particles.

2. The method according to claim 1 wherein catalyst particles are withdrawn from the dense fluid phase in the cooling zone and returned to the reaction zone at a rate substantially corresponding to the rate of entrainment of catalyst particles in the effluent product stream withdrawn from the reaction zone.

3. In the vapor phase, catalytic exothermic process of synthesizing hydrocarbons from hydrogen and carbon monoxide in the presence of a mass of solid particle synthesis catalyst active to effect the aforesaid synthesis, wherein said reactants are passed in contact with said synthesis catalyst in a reaction zone, under controlled, predetermined operating temperature, contact is maintained until a predetermined portion only of the reactants are converted into desired products of reaction, and the resulting effluent product stream containing unconsumed reactants is withdrawn from said reaction zone together with particles of entrained catalyst in a state of exothermic catalytic activity conducive to overheating under uncontrolled temperature conditions, the improvement which comprises promptly suppressing said undesired exothermic activity by introducing said effluent stream, while substantially at said recation temperature, directly into the lower portion of a mass of solid catalyst particles, in a uniform, turbulent state of dense phase fluidization, continuously maintaining said fluid phase mass of catalyst particles at a predetermined uniform temperature below the temperature of the said reaction zone, at which catalytic activity of the catalyst on the unconsumed reactants is substantially inhibited, by maintaining the said fluid phase mass in contact with cooling surfaces subjected to temperature control, regulating the rate of introduction of said product stream such that quenching of said stream is realized, and recovering quenched products of reaction from the fluidized mass of particles.

4. The method according to claim 3, wherein said cooling surfaces are subjected to temperature control by the passage of a cooling fluid at regulated temperature in contact therewith and in indirect heat exchange with said fluid phase mass.

5. In the vapor phase, catalytic exothermic process of synthesizing hydrocarbons from hydrogen and carbon monoxide in the presence of a mass of solid particle synthesis catalyst active to effect the aforesaid synthesis, wherein said reactants are passed in contact with said synthesis catalyst in a reaction zone, under controlled, predetermined operating temperature, contact is maintained until a predetermined portion only of the reactants are converted into desired products of reaction, and the resulting effluent product stream containing unconsumed reactants is withdrawn from said reaction zone together with particles of entrained catalyst in a state of exothermic catalytic activity conductive to overheating under uncontrolled temperature conditions, the improvement which comprises promptly suppressing said undesired exothermic activity by introducing said effluent stream while substantially at said reaction temperature, directly into a mass of solid particles maintained in a turbulent dense phase state of fluidization and disposed in contact with cooling surfaces subjected to temperature control such that the temperature of the fluidized mass of particles is continuously maintained within a range substantially below that of the reaction zone and at which said catalytic vapor phase reaction is substantially suppressed, and withdrawing the effluent reaction product stream from the fluidized mass of solid particles in cooled condition.

PERCIVAL C. KEITH.

REFERENCES CITED

The following references are of record in the file of this patent:

UNITED STATES PATENTS

| Number | Name | Date |
|---|---|---|
| 2,376,191 | Roetheli et al. | May 15, 1945 |
| 2,409,780 | Mekler | Oct. 22, 1946 |
| 2,417,164 | Huber | Mar. 11, 1947 |
| 2,420,542 | Jahnig | May 13, 1947 |
| 2,422,501 | Roetheli | June 17, 1947 |